(12) United States Patent
Jankovic et al.

(10) Patent No.: US 10,018,157 B2
(45) Date of Patent: Jul. 10, 2018

(54) METHODS AND SYSTEMS FOR BOOST CONTROL

(71) Applicant: Ford Global Technologies, LLC, Dearborn, MI (US)

(72) Inventors: Mrdjan J. Jankovic, Birmingham, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1107 days.

(21) Appl. No.: 13/829,648

(22) Filed: Mar. 14, 2013

(65) Prior Publication Data

US 2014/0260241 A1    Sep. 18, 2014

(51) Int. Cl.
| | |
|---|---|
| *F02D 23/00* | (2006.01) |
| *F02M 25/07* | (2006.01) |
| *F02D 23/02* | (2006.01) |
| *F02B 37/16* | (2006.01) |
| *F02B 37/18* | (2006.01) |

(Continued)

(52) U.S. Cl.
CPC ........... *F02M 25/077* (2013.01); *F02B 37/16* (2013.01); *F02B 37/18* (2013.01); *F02D 23/02* (2013.01); *F02D 41/0007* (2013.01); *F02D 41/1401* (2013.01); *F02D 11/10* (2013.01); *F02D 2041/141* (2013.01);

(Continued)

(58) Field of Classification Search
CPC ......... F02D 41/0007; F02D 2041/1433; F02D 23/00; F02D 2041/1409; F02D 2041/141; F02D 11/105; F02D 2041/1418; F02D 23/02; F02D 41/1401; F02D 11/10; Y02T 10/144; Y02T 10/47; Y02T 10/18; Y02T 10/40; F02B 37/18; F02B 37/16; F02M 25/0707; F02M 25/071; F02M 25/077

USPC .... 60/602, 605.2, 611, 605.1; 701/102, 103; 123/568.12, 568.21

See application file for complete search history.

(56) References Cited

U.S. PATENT DOCUMENTS

| | | |
|---|---|---|
| 3,614,259 A | 10/1971 | Neff |
| 4,351,154 A | 9/1982 | Richter |

(Continued)

FOREIGN PATENT DOCUMENTS

| | | | |
|---|---|---|---|
| DE | 102005010792 A1 * | 9/2006 | ............... F02B 37/16 |
| EP | 0435357 A1 | 7/1991 | |

(Continued)

OTHER PUBLICATIONS

Ulrey, Joseph Norman et al., "Methods and Systems for Boost Control," U.S. Appl. No. 13/965,901, filed Aug. 13, 2013, 54 pages.

(Continued)

*Primary Examiner* — Laert Dounis
*Assistant Examiner* — Matthew T Largi
(74) *Attorney, Agent, or Firm* — Julia Voutyras; McCoy Russell LLP (57) ABSTRACT

Methods and systems are provided for improving boost response. A continuously variable compressor recirculation valve and a wastegate are adjusted in complementary frequency bands to move compressor operation away from a surge limit and reduce boost delivery errors. An intake throttle is also concurrently adjusted to offset manifold air-flow rate errors resulting from the wastegate or recirculation valve adjustments.

17 Claims, 5 Drawing Sheets

(51) Int. Cl.
*F02D 41/00* (2006.01)
*F02D 41/14* (2006.01)
F02D 11/10 (2006.01)
F02M 26/02 (2016.01)

(52) U.S. Cl.
CPC ............ *F02D 2041/1409* (2013.01); *F02D 2200/0406* (2013.01); *F02M 26/02* (2016.02); *Y02T 10/144* (2013.01)

(56) References Cited

U.S. PATENT DOCUMENTS

| | | | |
|---|---|---|---|
| 4,389,845 | A | 6/1983 | Koike |
| 4,443,153 | A | 4/1984 | Dibelius |
| 4,544,326 | A | 10/1985 | Nishiguchi et al. |
| 4,949,276 | A | 8/1990 | Staroselsky et al. |
| 6,079,210 | A | 6/2000 | Pintauro et al. |
| 6,408,833 | B1 | 6/2002 | Faletti |
| 6,424,906 | B1* | 7/2002 | Zhu et al. ............ 701/115 |
| 6,565,479 | B2 | 5/2003 | Fattic et al. |
| 6,681,171 | B2 | 1/2004 | Rimnac et al. |
| 6,725,847 | B2 | 4/2004 | Brunemann et al. |
| 6,983,596 | B2 | 1/2006 | Frankenstein et al. |
| 7,137,253 | B2 | 11/2006 | Furman et al. |
| 7,163,005 | B2 | 1/2007 | Tussing et al. |
| 7,640,744 | B2 | 1/2010 | Rollinger et al. |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,333,071 | B2 | 12/2012 | Oakley et al. |
| 2003/0000507 | A1* | 1/2003 | Kobayashi ............ F02B 37/16 123/568.21 |
| 2003/0140906 | A1* | 7/2003 | Dollmeyer et al. ..... 123/568.22 |
| 2006/0196182 | A1 | 9/2006 | Kimoto et al. |
| 2008/0148727 | A1* | 6/2008 | de Ojeda ............ F02B 37/013 60/602 |
| 2008/0148827 | A1* | 6/2008 | Keski-Hynnila et al. . 73/114.31 |
| 2008/0163855 | A1 | 7/2008 | Matthews et al. |
| 2009/0071150 | A1 | 3/2009 | Joergl et al. |
| 2011/0023842 | A1 | 2/2011 | Kurtz |
| 2011/0094480 | A1 | 4/2011 | Suhocki et al. |
| 2011/0197580 | A1* | 8/2011 | Andrasko ............ F02D 23/00 60/602 |
| 2012/0014812 | A1 | 1/2012 | Blaiklock et al. |
| 2012/0297765 | A1 | 11/2012 | Vigild et al. |

FOREIGN PATENT DOCUMENTS

| | | |
|---|---|---|
| EP | 2317111 A1 | 5/2001 |
| EP | 1124047 A1 | 8/2001 |
| EP | 2426340 A1 | 3/2012 |
| EP | 2562397 A1 | 8/2012 |

OTHER PUBLICATIONS

Banker, Adam Nathan et al., "Methods and Systems for Torque Control," U.S. Appl. No. 13/965,917, filed Aug. 13, 2013, 46 pages.
McConville, Gregory Patrick et al., "Methods and Systems for Boost Control," U.S. Appl. No. 13/965,938, filed Aug. 13, 2013, 40 pages.
Ulrey, Joseph Norman et al., "Methods and Systems for Boost Control," U.S. Appl. No. 13/965,952, filed Aug. 13, 2013, 40 pages.
McConville, Gregory Patrick et al., "Methods and Systems for Boost Control," U.S. Appl. No. 13/965,963, filed Aug. 13, 2013, 45 pages.
Styles, Daniel Joseph et al., "Methods and Systems for Boost Control," U.S. Appl. No. 13/965,698, filed Aug. 13, 2013, 43 pages.
Buckland Julia Helen et al., "Methods and Systems for Surge Control," U.S. Appl. No. 113/965,725, filed Aug. 13, 2013, 38 pages.
Ulrey, Joseph Norman et al., "Methods and Systems for Condensation Control," U.S. Appl. No. 13/965,751, filed Aug. 13, 2013, 36 pages.
Ulrey, Joseph Norman et al., "Methods and Systems for Condensation Control," U.S. Appl. No. 13/965,763, filed Aug. 13, 2013, 37 pages.
Ulrey, Joseph Norman et al., "Methods and Systems for EGR Control," U.S. Appl. No. 13/966,006, filed Aug. 13, 2013, 56 pages.
Ulrey, Joseph Norman et al., "Methods and Systems for EGR Control," U.S. Appl. No. 13/965,794, filed Aug. 13, 2013, 56 pages.
Byrd, Kevin Durand et al., "Multi-Staged Wastegate," U.S. Appl. No. 13/570,025, filed Aug. 8, 2012, 26 pages.
Ulrey, Joseph Norman et al., "Method and System for Fuel Vapor Management," U.S. Appl. No. 13/660,884, filed Oct. 25, 2012, 38 pages.

\* cited by examiner

METHODS AND SYSTEMS FOR BOOST CONTROL

FIELD

The present application relates to methods and systems for coordinating wastegate actions with intake throttle and compressor recirculation valve actions to improve boost control.

BACKGROUND AND SUMMARY

Engine systems may be configured with boosting devices, such as turbochargers or superchargers, for providing a boosted aircharge and improving peak power outputs. The boost pressure may be regulated to a desired set-point through the actions of one or more boost actuators including, for example, a wastegate (WG) coupled across an exhaust turbine and a compressor surge valve (CSV) coupled across an intake compressor. The wastegate regulates the boost pressure by controlling the exhaust gas flow over the turbine while the compressor surge valve is commonly used for compressor surge management. Each actuator may be adjusted based on feed-forward and feedback components.

As one example, wastegate adjustments affect the boost pressure through relatively slow turbocharger dynamics while CSV adjustments, as well as intake throttle adjustments, affect the boost pressure through relatively fast dynamics. Due to the different dynamics, the action of the intake throttle, may have an immediate effect on boost pressure and may confound the wastegate control loop. As a result, the engine may operate, at least temporarily, in or close to a hard or soft surge region. Leaving the CSV open (when possible without degrading engine torque delivery) may alleviate surge tendencies but may lead to elevated exhaust pressures and increased engine pumping work. In addition, fuel economy may be degraded due to extra compressor work needing to be compensated by increased turbine work.

The inventors herein have identified that some of the above issues may be addressed by a method for a boosted engine system comprising: concurrently adjusting each of a wastegate, a compressor recirculation valve (CCRV), and an intake throttle to provide a desired boost pressure and manifold air flow. In this way, by operating the CCRV actuator in coordination with the intake throttle and the wastegate, a faster and more accurate regulation of boost pressure and engine torque output is achieved.

For example, a boosted engine system may include a turbocharger having a wastegate actuator coupled across the turbine and a continuously variable compressor recirculation valve (CCRV) coupled across the compressor. The CCRV may be configured like an intake throttle so that it can be actuated fully open, fully closed, or any position therebetween. In response to a boost demand, a controller may feed-forward adjust the wastegate position based on the desired (or reference) boost pressure and the operating conditions. For example, to increase boost pressure, the wastegate may be moved to a more closed position to increase turbine inlet pressure and turbine speed, while to decrease boost pressure, the wastegate may be moved to a more open position to decrease turbine inlet pressure and turbine speed. In addition, feedback adjustments to wastegate position may be based on the difference between the actual (measured) boost pressure and the desired boost pressure.

As such, due to the slow turbocharger dynamics associated with the actuation of the wastegate, the desired boost pressure change is achieved slowly since the wastegate first needs to accelerate (or decelerate) the turbine and the compressor. Thus, in coordination with the wastegate adjustment, a compressor recirculation valve (CCRV) is adjusted concurrently. Specifically, the CCRV is feed-forward adjusted based on operating conditions and a compressor pressure ratio to move turbocharger operation away from a hard surge limit to within a soft surge region. The CCRV is then feedback adjusted to correct for boost errors resulting from the wastegate adjustment. Since the impact of the CCRV adjustment on boost pressure is substantially immediate, the CCRV and the wastegate can be used together to provide accurate steady state boost pressure regulation in the presence of uncertainties and external disturbances. Likewise, intake throttle adjustments may also be concurrently used to take advantage of the rapid turbocharger dynamics associated with throttle actuation. For example, the intake throttle is adjusted based on a manifold flow rate error resulting from the wastegate and the CCRV adjustments, and in relation to the desired manifold flow rate. The throttle adjustment thereby allows for a more accurate air flow, and consequently more accurate torque delivery, in the boosted operating region.

In this way, a combination of wastegate, compressor recirculation valve, and intake throttle adjustments may be used to improve boost delivery and torque output. By using a continuously variable compressor recirculation valve to provide boost control in a frequency band that is complementary to the frequency band of the wastegate, both boost actuators may complement each other to provide higher gain tuning of boost pressure, improved boost response and more accurate boost pressure delivery while operating the compressor away from a surge limit. By also adjusting an intake throttle to correct for air flow rate errors resulting from the boost pressure control, both an accuracy and speed of torque delivery during boosted engine operation is improved. Overall, boosted engine performance is improved, providing fuel economy benefits.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
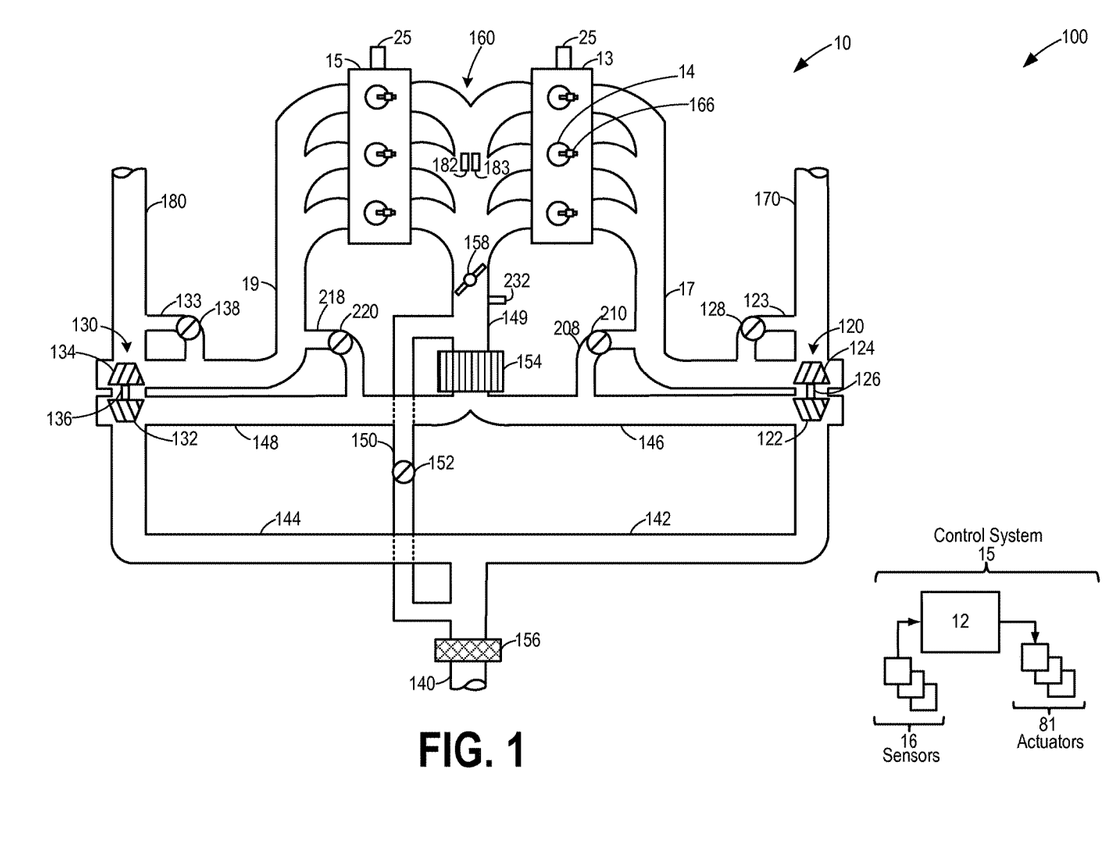
FIG. 1 shows a schematic depiction of an example boosted engine system.
Figure 2:
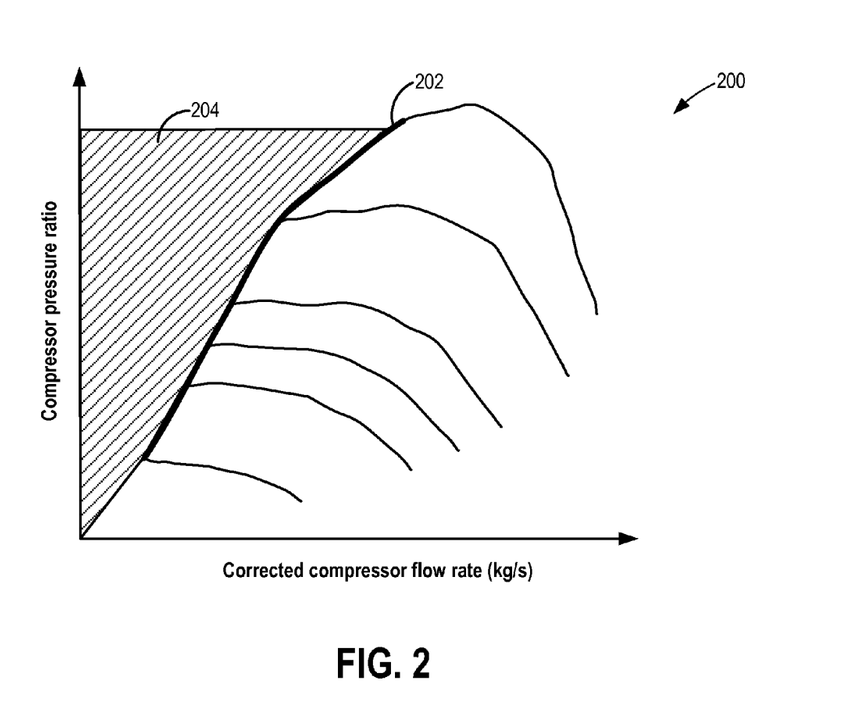
FIGS. 2-3 show compressor maps depicting hard surge and soft surge regions.
Figure 3:
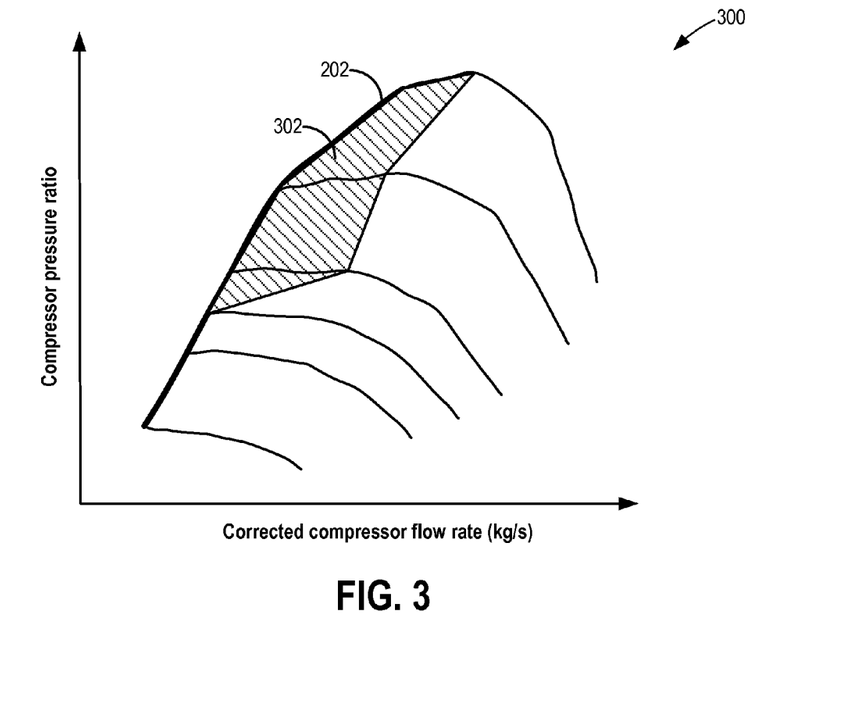

The following description relates to systems and methods for improving boost pressure control in a boosted engine system, such as the system of FIG. 1. Wastegate and compressor recirculation valve adjustments (FIG. 4) may be concurrently used to operate a turbocharger within surge limits (FIGS. 2-3). A controller may be configured to perform a control routine, such as the routine of FIG. 5, to perform feed-forward and feedback adjustments to the position of a wastegate and a compressor recirculation valve to accurately provide a boosted pressure and meet a boosted torque demand. The controller may also adjust the position of an intake throttle to compensate for air flow errors resulting from the wastegate and/or recirculation valve adjustments. The controller may also adjust a gain function of the wastegate based on the functionality of the compressor recirculation valve to further improve boost delivery time and precision. An example adjustment is shown with reference to FIG. 6. In this way, boost accuracy is increased.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. Engine system 100 may be a split-engine system wherein intake passage 140 is branched downstream of air filter 156 into first and second parallel intake passages, each including a turbocharger compressor. In the resulting configuration, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 may include an air cooler 154 and an air intake throttle 158. The position of intake throttle 158 can be adjusted by the control system via a throttle actuator (not shown) communicatively coupled to controller 12.

A compressor recirculation passage 150 may be provided for compressor surge control. Specifically, to reduce compressor surge, such as on a driver tip-out, boost pressure may be dumped from the intake manifold, downstream of air cooler 154 and upstream of intake throttle 158, to intake passage 140 (in particular, downstream of air filter 156 and upstream of the junction of intake passages 142 and 144). By flowing boosted air from upstream of an intake throttle inlet to upstream of the compressor inlets, boost pressure may be rapidly reduced, expediting boost control. Flow through compressor recirculation passage 150 may be regulated by adjusting the position of compressor surge valve 152 positioned therein. In the depicted example, compressor recirculation valve 152 may be a continuously variable valve whose position can be adjusted to a fully open position, a fully closed position, or any position there-between. Thus recirculation valve 152 may also be referred to herein as a continuously variable compressor recirculation valve, or CCRV. In the depicted example, CCRV 152 is configured as a throttle valve, although in other embodiments, the CCRV may be configured differently (e.g., as a poppet valve). It will be appreciated that while the CCRV is shown configured for a V-6 twin turbocharged engine in FIG. 1, the CCRV may be similarly applied in other engine configurations, such as applied to I-3, I-4, V-8, and other engine configurations with one or multiple turbochargers. In an alternate configuration, the recirculation passage may be located such that flows travels from upstream of air cooler 154 to a location upstream of compressors 120 and 130. In another configuration, there may be two recirculation paths, each with a recirculation valve, each located such that flow travels from the compressor exit to the compressor inlet.

During nominal engine operating conditions, the continuously variable compressor recirculation valve 152 may be kept nominally closed, or nearly closed. In such a position, the valve may be operating with known or negligible leakage. Then, in response to surge, an opening of the CCRV 152 may be increased. In some embodiments, one or more sensors may be coupled in compressor recirculation passage 150 to determine the mass of recirculated flow delivered from the throttle inlet to the intake passage. The various sensors may include, for example, pressure, temperature, and/or flow sensors.

In alternate embodiments, the compressor recirculation valve may be configured as a two-position valve adjustable to one of a fully closed and a fully open position. However, as elaborated herein, the inventors have recognized that by using a CCRV, boost regulation is improved. In addition, by coordinating the operation of the CCRV with those of a wastegate, boost response and surge margins can be improved.

As such, the impact of the opening or closing of the CCRV 152 on boost pressure is substantially immediate. This allows immediate boost and surge control. With reference to FIG. 2, it shows a compressor map 200 depicting a hard surge region. Specifically, the map shows a change in compressor pressure ratio (along the y-axis) at different compressor flow rates (along the x-axis). Line 202 shows a hard surge line for the given operating conditions. Compressor operation to the left of hard surge line 202 results in operation in a hard surge region 204 (depicted as shaded region 204). Compressor operation in hard surge region 204 results in objectionable NVH and perhaps degradation of engine performance. Thus, by opening CCRV 152, compressor operation may be moved away from both the hard surge line and the hard surge region. As shown in FIG. 3, at compressor map 300, there exists a soft surge region 302 (depicted as shaded region 302) that may result in objectionable NVH, albeit less severe, and may also cause degradation of engine performance. The CCRV opening can be adjusted to move compressor operation out of (that is, to the right of) soft surge region 302. In doing so, surge is immediately reduced, and boosted engine performance is improved.

However, continuously recirculating the air around the compressors can lead to fuel economy losses as the extra compressor work has to be made up by additional turbine work. The increased turbine work typically leads to higher exhaust pressures and increased engine pumping work. Thus, as elaborated with reference to FIGS. 4-5, by coordinating adjustments to the CCRV with adjustments to a turbine wastegate, boost control can be achieved with fuel economy improvements.

Engine 10 may include a plurality of cylinders 14. In the depicted example, engine 10 includes six cylinders arranged in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

The wastegate actuators regulate boost pressure by controlling exhaust flow over the corresponding turbines. However, in contrast to the actuation of the compressor recirculation valves, the impact of wastegate actuation on boost pressure is substantially slower due to slower turbocharger dynamics. Specifically, to change boost pressure, the wastegate first needs to accelerate the turbine and the compressor (since they are connected on the same shaft). A controller controls wastegate action via feed-forward and feedback components. The feed-forward component responds to the desired (reference) boost pressure and the operating conditions, while the feedback component responds to the difference between the actual (measured or estimated) boost pressure and the desired boost pressure. The feedback adjustment responsive to boost pressure regulation error adjusts the opening of the wastegate to achieve accurate steady-state boost pressure regulations in the presence of uncertainties and external disturbances. However, any action of the compressor recirculation valve, as well as the intake throttle (which also has a substantially immediate impact on boost pressure), can confound the wastegate control which is not fast enough to cancel the effect of the compressor recirculation valve or the intake throttle. While disabling or limiting intake throttle operation in the boosted operating region can reduce the wastegate control issues, engine performance can also be negatively affected. In other embodiments, the intake throttle may be kept wide open when operating in the boosted region, however, this results in less accurate manifold air-flow and hence, less accurate torque delivery in the boost region.

The inventors herein have recognized that by concurrently adjusting each of a turbine wastegate, an intake throttle, and a continuously variable compressor recirculation valve, the boost control issues can be overcome and a desired boost pressure can be provided. In addition, an accurate control of air delivered to the cylinders—and, hence, engine torque—can be achieved. Specifically, by operating the CCRV in co-ordination with the intake throttle and in a complementary frequency band with the wastegate, a faster and more accurate regulation of boost pressure is achieved. In particular, as elaborated with reference to FIGS. 4-5, the approach enables the wastegate control loop to be tuned more aggressively because the fast actuating CCRV would be able to damp any oscillations and remove (or reduce) any resulting boost pressure overshoot.

For example, in response to a boost demand, a controller may adjust a wastegate coupled across an exhaust turbine to meet the boost demand and then adjust a continuously variable recirculation valve coupled across an intake compressor based on the wastegate adjustment and further based on boost errors. As an example, the wastegate may be feed-forward adjusted to a first position based on the boost demand and feedback adjusted from the first position (e.g., to a second wastegate position) based on an error between actual boost and the boost demand. The CCRV may, in turn, be feed-forward adjusted to a first position based on a compressor outlet flow rate resulting from the wastegate adjustment relative to each of a hard surge limit and a soft surge limit of the compressor (under the given operating conditions). This moves the compressor operation away from the surge regions, improving compressor performance. The CCRV may be further feedback adjusted from the first position (e.g., to a second recirculation valve position) based on the error between the actual boost and the boost demand. An intake throttle coupled upstream of the compressor may then be adjusted based on the actual boost and intake manifold pressure to achieve the desired manifold air flow rate. The CCRV may be further adjusted in response to the throttle adjustment to compensate for boost pressure deviations arising due to the intake throttle adjustment.

Further, the feedback adjusting of the wastegate may be performed with higher gain tuning. By applying a higher gain tuning to the wastegate loop, the boost response is improved. In the event of CCRV degradation, the gain tuning of the wastegate's feedback adjustment can be reduced to a lower (or default) gain tuning. In this way, wastegate control is improved.

Returning to the description of FIG. 1, exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

In some embodiments, engine 10 may further include one or more exhaust gas recirculation (EGR) passages for recirculating at least a portion of exhaust gas from first and second parallel exhaust passages 17 and 19 and/or first and second parallel branched exhaust passages 170 and 180, to first and second parallel intake passages 142 and 144, and/or parallel branched intake passages 146 and 148 or intake manifold 160. These may include high-pressure EGR loops for providing high-pressure EGR (HP-EGR) and low-pressure EGR-loops for providing low-pressure EGR (LP-EGR). When included, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously. The low-pressure EGR loops may recirculate at least some exhaust gas from each of the branched parallel exhaust passages, downstream of the exhaust turbine, to the corresponding parallel intake passage, upstream of the compressor. Each of the LP-EGR loops may have corresponding LP-EGR valves, for controlling exhaust flow through the LP-EGR loop, as well as respective charge air coolers for lowering a temperature of exhaust gas recirculated to the engine intake. The high-pressure EGR loops may recirculate at least some exhaust gas from each of the parallel exhaust passages, upstream of the exhaust turbine, to the corresponding parallel intake passage, downstream of the compressor. EGR flow through the HP-EGR loops may be controlled via respective HP-EGR valves and HP-EGR charge air coolers.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include a humidity sensor, MAP sensor 182, and MCT sensor 183. In some examples, common intake passage 149 may include a throttle inlet pressure (TIP) sensor 232 for estimating a throttle inlet pressure, also referred to as the boost pressure, and/or a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210 and 220, LP-EGR valves (not shown), throttle valve 158, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-5.

Figure 4:
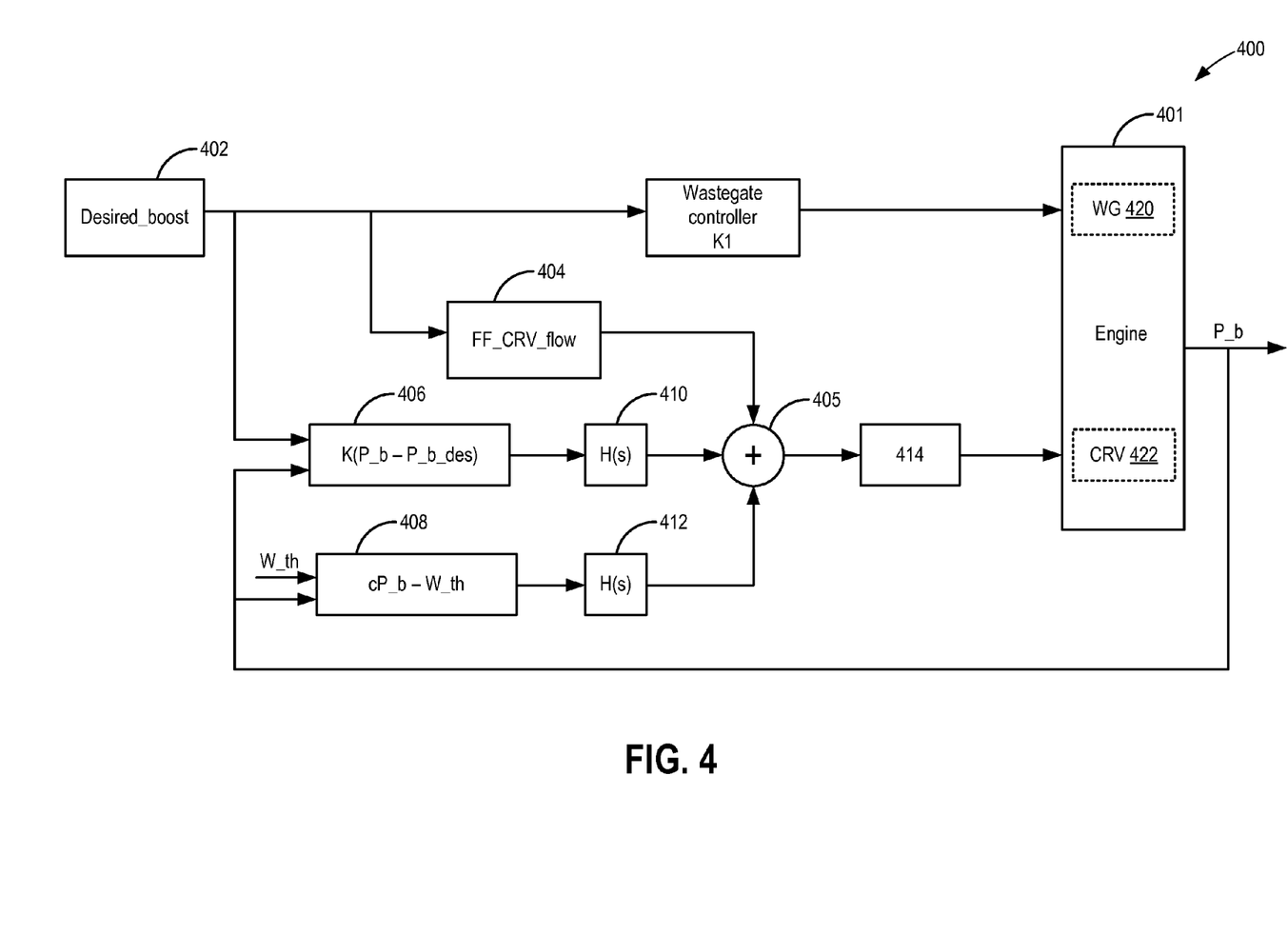
FIG. 4 shows a block diagram of a boost control system using WG and CCRV actuators.

Now turning to FIG. 4, a block diagram 400 depicting boost control using wastegate and CCRV adjustments is shown. The control method depicted in diagram 400 may be executed by an engine controller, or a boost control module of the controller, that is configured with computer readable code.

A desired boost pressure 402 is determined based on operator torque demand, pedal position, etc. The desired boost pressure is received at wastegate controller K1 which adjusts the position of the wastegate (WG 420) in engine 401. The wastegate controller K1 also receives the boost pressure feedback signal TIP (the connection is not shown in FIG. 4). This constitutes the wastegate loop of the control system. In particular, the waste-gate actuator is allowed to control the low frequency (slow) behavior of the boost pressure with a feedback component of the wastegate control tuned more aggressively (that is, with a higher gain tuning). As an FMEM action, in case of a CCRV actuator fault, a less aggressive calibration of the wastegate loop is restored.

A CCRV control loop is also adjusted based on the desired boost pressure 402. The CCRV control loop consists of feed-forward, feedback, and disturbance-cancelling portions. The feed-forward part enables compressor surge management. Specifically, it keeps the operating point of the compressor at the correct place (e.g., to the right of) relative to the hard surge line and soft surge region (as discussed in FIGS. 2-3). The feedback portion of the CCRV control action responds to the boost regulation error (feedback). It moves to reduce the CCRV air flow if actual boost pressure (P_b) is less than the desired boost pressure (P_desired; 402) and likewise, it increases the CCRV air flow if P_b is higher than P_desired.

The disturbance-cancelling portion of the CCRV control loops acts preemptively to reduce the impact of throttle movement on boost pressure. In this way it tries to decouple the engine air flow control from boost pressure response, at least at higher frequencies where the wastegate has little control authority. The CCRV feedback is high-pass filtered so that the impact of the CCRV adjustment on steady state values, including fuel economy, is removed. A similar high-pass filter is also applied to the disturbance-cancelling part of the CCRV action.

The waste-gate controller structure could include carry-over from non-CCRV applications, however, the presence of the CCRV action allows more aggressive calibration. For example, the calibration of the wastegate control loop could allow some overshoot (e.g., up to 20%) in the boost pressure when operated with the intake throttle open and the CCRV closed. The bandwidth of this control loop, wg_bw, would be estimated, as it may be needed for the CCRV loop design. When the CCRV is activated, the overshoot should be reduced to 0 to 5%.

Returning to map 400, based on desired boost pressure 402, a desired CCRV flow 414 is determined. In particular, the desired CCRV flow 414 is determined by adding three separate components viz., a feed-forward flow component 404, a feedback flow component 406, and a disturbance cancelling component 408. The feed-forward component is intended to assure that, in steady state, the compressor operating point is away from the hard surge line and outside the soft surge region (as discussed with reference to FIGS. 2-3). The feed-forward component 404 is computed from the desired engine flow rate and the desired boost pressure. The latter, divided by the compressor inlet pressure (which is close to ambient pressure), gives the boost pressure ratio. Maps 200 and 300 of FIGS. 2-3 are used to determine how much compressor airflow is needed to avoid hard and soft surge. For a single turbocharger, the CCRV flow, W_crv_ff, is the difference between the minimal compressor air flow, W_c_min, needed to avoid hard/soft surge and the desired engine flow as per equation (1):

$$W\_crv\_ff = \max\{0, W\_c\_min - W\_e\_des\} \quad (1)$$

or, in case of a twin-turbo engine, as in the engine system of FIG. 1, as per equation (2):

$$W\_crv\_ff = \max\{0, 2W\_c\_min - W\_e\_des\} \quad (2)$$

The feedback component 406 of CCRV flow is computed as an additive CCRV flow, proportional to the difference between the desired boost pressure (P_b_des) and the actual boost pressure (P_b). To avoid continuous CCRV actuation that would replace the WG action, a proportional term 405 is filtered through a high-pass filter 410 to obtain a feedback CCRV flow as per equation (3):

$$W\_crv\_fb = kH(s)(P\_b - P\_b\_des) \quad (3)$$

where k is an adjustable gain and $H(s) = s/(s+wg\_bw)$ is a high-pass filter 410 with the critical high-pass frequency equal to the bandwidth of the wastegate control loop (wg_bw) described above. Alternatively, the critical frequency could be consider a tuning parameter and adjusted to improve the response of the system.

Finally, the disturbance-cancelling component 408 is intended to remove the effects of throttle actuation on boost pressure. It compares a commanded, or estimated, throttle flow (W_th) to a flow corresponding to wide open throttle. As in the case of the feedback component 406, this component is also filtered through a high-pass filter 412 to allow only transient actuation, leaving the slow and steady state action to waste gate, as per equation (4):

$$W\_crv\_dist = H(s)(cP\_b - W\_th) \quad (4)$$

$$c = \frac{N}{120} \frac{V\_d}{RT\_m} \eta\_vol$$

where H(s) is the same high pass filter as above (that is, high pass filters 410 and 412 are the same), V_d is the engine displacement, N is the engine speed, T_m is the manifold or throttle inlet temperature, and η_vol is the engine volumetric efficiency.

With the three components taken together, the desired CCRV flow 414 is determined as per equation (5):

$$W\_crv = \max\{0, W\_crv\_ff + W\_crv\_fb + W\_crv\_dist\} \quad (5)$$

It will be appreciated that while the depicted control diagram applies three components in determining CCRV flow, in other embodiments, the CCRV flow may be determined using only one or two of the three flow components.

A CCRV opening command (CCRV_command) is then obtained based on the desired CCRV flow by the standard inversion of the orifice flow equation. The opening command is then commanded to CCRV 422 of engine 401. Alternatively, the opening command could be determined from a calibratable look-up table.

In this way, wastegate and CCRV positions are controlled concurrently and inter-dependently, alongside throttle adjustments to reduce compressor surge and improve boost accuracy.

Figure 5:
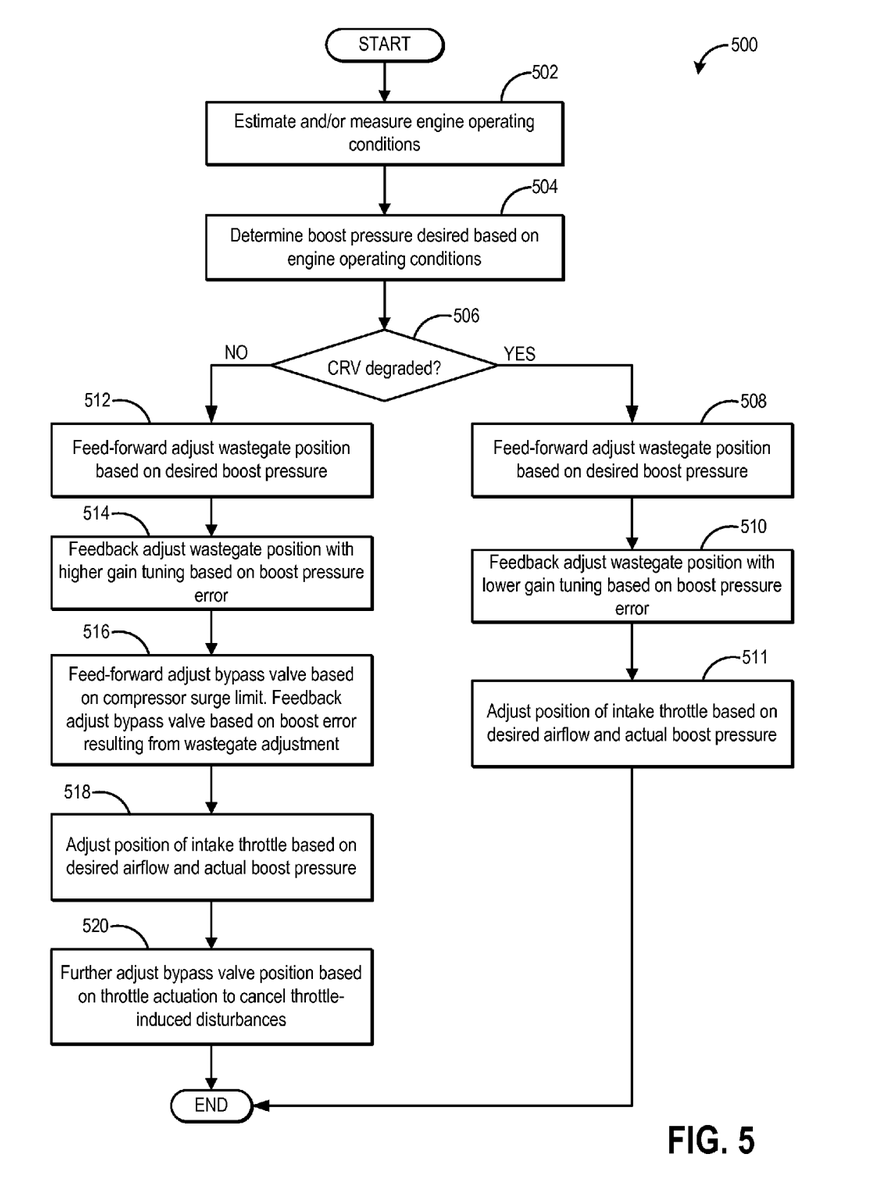
FIG. 5 shows a high level flow chart for adjusting wastegate feedback and feed-forward control based on CCRV functionality.

Now turning to FIG. 5, an example routine 500 is shown for adjusting a wastegate, a continuously variable compressor recirculation (or recirculation) valve and an intake throttle to provide more accurate boost control. Specifically, the method concurrently adjusts each of a wastegate, a compressor recirculation valve, and an intake throttle to provide a desired boost pressure.

At 502, the routine includes estimating and/or measuring engine operating conditions. These include, for example, pedal position, torque demand, boost demand, turbine speed, compressor inlet temperature, engine temperature, MAP, MAF, BP, etc. At 504, a desired boost pressure may be determined based on the estimated operating conditions. For example, in response to a tip-in where increased torque is demanded, a desired increase in boost pressure may be determined. In another example, in response to a tip-out where decreased torque is demanded, a desired decrease in boost pressure may be determined. Determining an increase or decrease in boost pressure includes determining a final boost pressure desired (relative to the current boost pressure), determining a final turbine speed desired (relative to the current turbine speed), as well as a final compressor ratio desired (relative to the current compressor ratio and surge limits at the operating conditions).

At 506, it may be determined if the compressor recirculation valve (herein also referred to as CCRV) is degraded. As elaborated earlier, the compressor recirculation valve may be a continuously variable recirculation valve that can be adjusted to a fully open position, a fully closed position, or any position there-between, such as a partially open or partially closed position. Determining if the CCRV is degraded may include, for example, determining if a flag indicating degradation of the CCRV has been set. In one example, CCRV degradation may be determined during the implementation of various on-board diagnostic routines based on CCRV position sensor and CCRV response to command to change the position. As such, if the CCRV is degraded, then the higher wastegate loop gains, tuned as discussed above, could result in an overshoot of the boost pressure response. To reduce the overshoot, the wastegate loop should revert to the lower set of gains tuned for the case when CCRV remains inactive.

If the CCRV is not degraded, then the controller proceeds to adjust the wastegate based on the desired boost pressure. Specifically, the routine includes, at 512, feed-forward adjusting the wastegate to a first wastegate position based on the desired boost pressure. For example, the wastegate may be moved to a first position that is more closed as the desired boost pressure increases responsive to a tip-in. By closing the wastegate, exhaust manifold pressure and turbine inlet pressure is increased. This raises turbine speed and consequently turbine power. As an alternate example, the wastegate may be moved to a first position that is more open as the desired boost pressure decreases responsive to a tip-out. By opening the wastegate, exhaust manifold pressure and turbine inlet pressure are decreased, reducing turbine speed and consequently turbine power.

Next, at 514, the routine includes feedback adjusting the wastegate with a higher gain tuning from the first wastegate position to a second, different wastegate position based on an error between actual boost pressure and the desired boost pressure. Adjusting the wastegate with a higher gain tuning causes the wastegate feedback loop to be calibrated more aggressively. By using a higher gain tuning, a faster, but less accurate, boost pressure control is achieved via the wastegate control loop. The accuracy is then restored through the action of the CCRV actuator at 516. In one example, the higher gain tuning configuration is a default configuration of the wastegate that is over-ridden in response to the CCRV being degraded.

After setting the wastegate position with feed-forward and feedback adjustments at 512-514, the routine proceeds to adjust the compressor recirculation valve based on a surge limit and further based on a boost error resulting from the wastegate adjustment. Specifically, at 516, the routine includes feed-forward adjusting the position (or opening) of the CCRV based on a compressor surge limit. For example, an opening of the recirculation valve may be increased in response to a compressor ratio being at or around a hard surge limit. As elaborated with reference to FIGS. 2-3, by increasing the opening the CCRV when the turbocharger compressor is operating at or near the hard/soft surge limit, the compressor may be moved out of a hard/soft surge region. As such, by moving the turbocharger away from the hard surge limit, compressor performance and boost control is improved.

Adjusting the CCRV further includes feedback adjusting the recirculation valve based on the error between boost pressure and the desired boost pressure. The error may be in part due to the aggressive feedback adjustment of the wastegate at 514. For example, as the boost error increases, the CCRV opening may be decreased to increase boost pressure, while the CCRV opening may be increased to decrease boost pressure. As such, since the impact of the CCRV adjustment on boost pressure is substantially immediate, by using the CCRV adjustment in concert with the wastegate that is adjusted at a higher gain tuning, and at a complementary frequency band to the wastegate actuator, a faster and more accurate regulation of boost pressure is achieved. In addition, the fast CCRV actuation is able to damp pressure oscillations and reduce (e.g., remove) boost pressure overshoot.

Next at 518, the routine includes adjusting the intake throttle to achieve the desired manifold air flow rate. As such, the desired manifold air flow rate may be based on driver torque demand with the air flow rate increased as the torque demand increases. For example, as the actual or estimated manifold air flow resulting from the wastegate and recirculation valve adjustments becomes lower than a desired air flow rate, the intake throttle opening may be increased to compensate for the errors and increase manifold air flow. As another example, as the actual or estimated manifold air flow resulting from the wastegate and recirculation valve adjustments becomes higher than a desired air flow rate, the intake throttle opening may be decreased to compensate for the error and decrease manifold air flow. In another example, the intake throttle is actuated directly in response to the actual boost pressure measurement (TIP sensor) that itself responds to the wastegate and the recirculation valve adjustments. As such, the throttle is adjusted to reduce errors between a desired airflow rate (based on operator torque demand) and actual boost pressure (resulting from the wastegate and CCRV adjustments).

At 520, the routine includes further adjusting the position of the compressor recirculation valve based on disturbances in boost pressure arising due to the throttle adjustments. For example, a disturbance-cancelling portion of CCRV flow control may adjust the position of the CCRV to reduce or remove the effects of throttle actuation on the boost pressure. Herein, the CCRV is adjusted to reduce boost pressure errors between the desired boost pressure and the actual boost pressure resulting from the feed-forward and feedback adjusting of the wastegate and from the throttle action to regulate the manifold air flow.

Returning to 506, if the CCRV is degraded, then at 508, as at 512, the routine includes feed-forward adjusting the wastegate to a first position based on the desired boost pressure. Then at 510, the wastegate is adjusted with a lower gain tuning from the first position to an alternate second position (alternate from the second position the wastegate is set to at 514) based on an error between boost pressure and the desired boost pressure. Adjusting the wastegate with a lower gain tuning causes the wastegate feedback loop to be calibrated less aggressively. By using a lower gain tuning, a slower boost pressure control is achieved via the wastegate control loop. In one example, the higher gain tuning configuration is a default configuration of the wastegate that is over-ridden and the feedback component of the wastegate control is shifted from the higher gain tuning to the lower gain tuning as an FMEM action. Next, at 511, as at 518, the routine includes adjusting the intake throttle to achieve the desired manifold air flow rate recirculation. For example, as the actual or estimated manifold air flow resulting from the wastegate and recirculation valve adjustments becomes lower than a desired air flow rate, the intake throttle opening may be increased to compensate for the errors and increase manifold air flow. As another example, as the actual or estimated manifold air flow resulting from the wastegate and recirculation valve adjustments becomes higher than a desired air flow rate, the intake throttle opening may be decreased to compensate for the error and decrease manifold air flow. In another example, the intake throttle is actuated directly in response to the actual boost pressure measurement (TIP sensor) that itself responds to the wastegate and the recirculation valve adjustments.

In one example, an engine system comprises an engine including an intake and an exhaust, a turbocharger for providing a boosted aircharge to the engine, the turbocharger including an exhaust turbine and an intake compressor, a wastegate coupled across the turbine, a continuously variable recirculation valve coupled across the compressor, and an intake throttle coupled to the intake, downstream of the compressor. A controller with computer readable instructions may be configured to operate the engine system in different modes (specifically different control modes) to enable boost pressure control. The different control modes may involve the use of different control loops including a wastegate control loop (when a wastegate actuation is included in the operating mode), a CCRV control loop (when a CCRV actuator is included in the operating mode), and a throttle control loop (when an intake throttle is actuated in the operating mode).

For example, the controller may operate the engine system in a first mode wherein a position of the wastegate, the intake throttle, and a position of the recirculation valve are adjusted to provide a desired boost pressure based on operator torque demand. The controller may further operate the engine system in a second mode wherein only the position of the wastegate and the intake throttle are adjusted to provide the desired boost pressure based on the operator torque demand. The controller may operate the engine system in the first mode in response to no indication of recirculation valve degradation, while operating the engine system in the second mode in response to an indication of recirculation valve degradation. When operating the engine system in the first mode, the position of the wastegate may be adjusted with a higher gain tuning, while when operating the engine system in the second mode, the position of the wastegate is adjusted with a lower gain tuning.

As an example, operating in the first mode may include feed-forward adjusting the wastegate to a first position based on the desired boost pressure, feedback adjusting the wastegate from the first position based on an error between actual boost pressure and the desired boost pressure, and adjusting the throttle to a position based on a flow rate error between a flow rate based on the actual boost pressure resulting from the wastegate adjustment and flow rate based on the desired boost pressure. As another example, operating in the second mode may include feed-forward adjusting the wastegate to the first position based on the desired boost pressure, feed-back adjusting the wastegate from the first position based on an error between actual boost pressure and the desired boost pressure, feed-forward adjusting the recirculation valve to a second position based on a compressor surge limit, and feed-back adjusting the recirculation valve from the second position based on a error between actual boost pressure resulting from the wastegate adjustment and the desired boost pressure. Further, the throttle may be adjusted to a third position based on a flow rate error between a flow rate based on an actual boost pressure resulting from the wastegate and recirculation valve adjustments and a flow rate based on the desired boost pressure.

Figure 6:
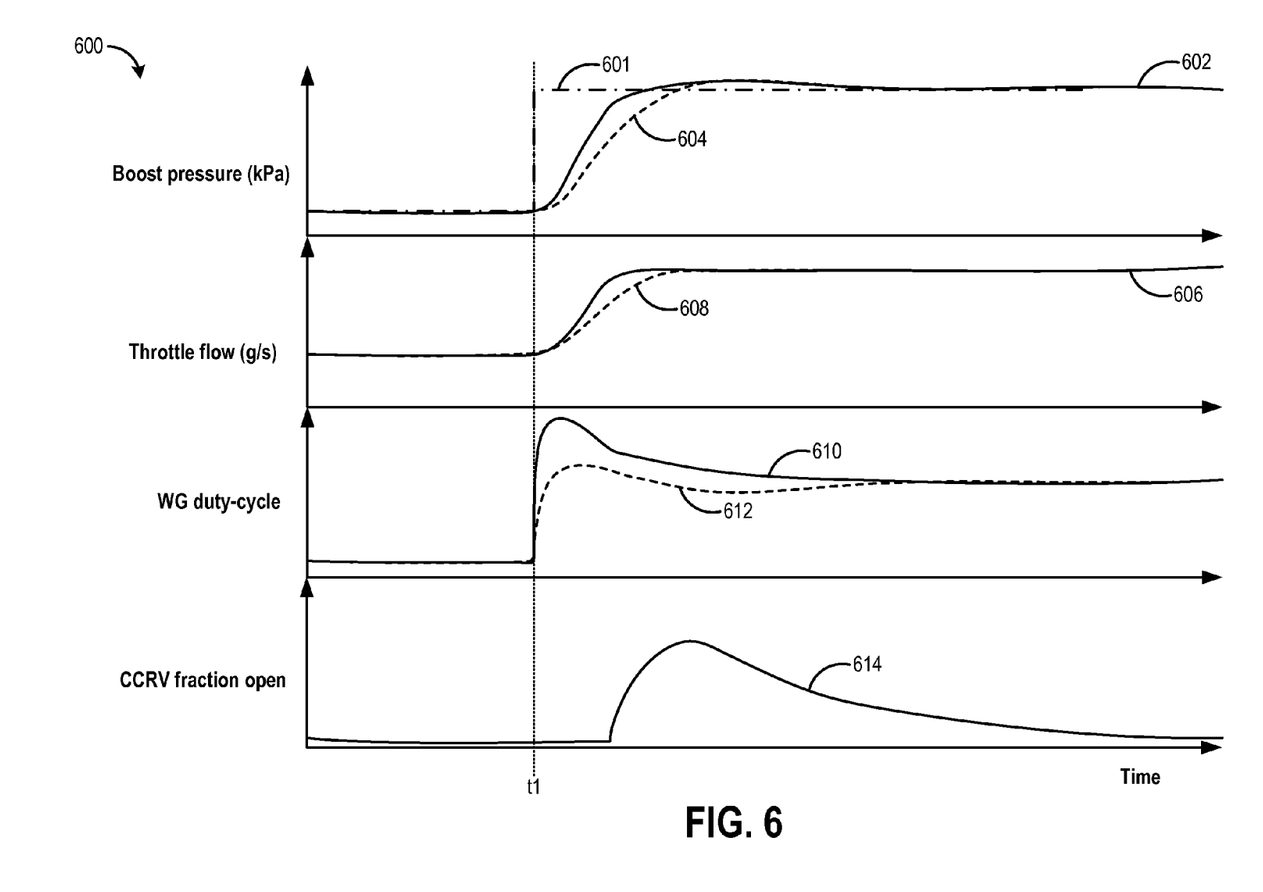
FIG. 6 shows an example coordination of WG and CCRV adjustments to provide a desired boost pressure, according to the present disclosure.

Now turning to FIG. 6, an example concerted adjustment of a wastegate, a CCRV, and an intake throttle is shown. The combination allows rapid and accurate boost pressure control, in particular during a tip-in or tip-out. Map 600 depicts changes in boost pressure at plots 602 and 604, in relation to an operator boost demand at plot 601, an intake throttle (manifold) air flow at plots 606 and 608, wastegate (WG) duty-cycle adjustments at plots 610 and 612, and a CCRV open fraction at plot 614. In each case, adjustments are shown with CCRV actuation (as solid lines at plots 602, 606, and 610) and without CCRV actuation (as dashed lines at plots 604, 608, and 612). All plots are depicted over time of engine operation, along the x-axis.

Prior to t1, the engine may be operating with a boost level (plot 602, solid line) substantially at or around the desired boost level (plot 601, dashed and dotted line). Specifically, the boost level desired may be relatively lower, and thus the engine may be operated with the CCRV closed (e.g., at a fully closed position) and with the wastegate at a duty cycle around 0 (that is, with the wastegate fully open).

At t1, the desired boost pressure (plot 601) may increase, for example, in response to a tip-in. To meet the increased boost demand, first the wastegate is actuated. Specifically, the wastegate duty cycle is moved towards 100% so that a current is applied on the wastegate solenoid to close the wastegate. By closing the wastegate, an exhaust manifold pressure upstream of an exhaust turbine is increased, increasing turbine inlet pressure and turbine power. As such, the wastegate is actuated aggressively to allow boost pressure to be rapidly raised. While the wastegate duty cycle is being increased, the CCRV is initially maintained closed. After the wastegate duty cycle has reached and stayed at 100% for a short duration, the wastegate duty cycle is reduced and the CCRV opening is gradually increased. As a result, the wastegate is left partially open to provide the boost pressure needed to operate the engine at higher loads, while the CCRV opening is increased to suppress boost pressure overshoot. The combination of aggressive wastegate actuation in concert with the opening of the CCRV allows the boost pressure to be rapidly raised towards the desired boost pressure level (plot 602). In the absence of CCRV actuation, the more aggressive wastegate actuation (of plot 610) would have resulted in 25-30% boost pressure overshoot. To reduce this surge, in the absence of CCRV actuation, the wastegate may have been actuated less aggressively (as shown at plot 612) resulting in slower attainment of the desired boost pressure (as shown at plot 604). In one example, the concerted use of the CCRV allows the wastegate to be actuated with a feedback gain that is 70% higher (plot 610) than the gain used with no CCRV action (plot 612).

By increasing an opening of the CCRV while the wastegate is closed with higher gain tuning, more compressed air may be directed to the engine intake, increasing boost pressure. In addition, by opening the CCRV, boost pressure overshoot is suppressed. The CCRV action then phases out after reaching a peak due to a high-pass filtering of the CCRV output. This not only improves fuel economy but also reduces likelihood of surge.

The combined approach expedites the impact of the wastegate adjustment on boost pressure, improving the time taken to meet the boost demand. In addition, the CCRV may be closed with a lower gain tuning (since the CCRV is already a fast acting actuator) to quickly raise boost pressure and then adjusted to a nominal setting based on the operating conditions. As a result of the combination of the wastegate and CCRV adjustments, the actual boost level (plot 604) may reach the desired boost level soon after t1.

As such, if the CCRV is degraded, the engine controller may change wastegate control loop settings such that the wastegate is adjusted with lower gain turning. As shown at plot 612, when actuated with lower gain tuning, the wastegate adjustments allows for accurate boost control, albeit at a slower response rate (plot 604).

Also at t1, in response to operator demand, an intake throttle opening is increased to increase manifold airflow (plot 606). The combined use of wastegate adjustments and CCRV adjustments results in fewer manifold flow rate errors, and therefore fewer boost and torque output errors. As can be seen by comparing plots 606 and 608, the action of the CCRV shaves off about $\frac{1}{3}$ of the turbo lag, enabling the desired torque output to be achieved rapidly.

In this way, adjustments to a wastegate and a compressor recirculation valve in complementary frequency bands can be used to provide faster and more accurate boost control. By using a higher gain calibration for the slower responding wastegate, the response time of the wastegate to boost pressure changes in improved. By using a lower gain calibration for the faster responding compressor recirculation valve, pressure oscillations are damped and boost overshoot is reduced. In addition, compressor surge is averted. By concurrently adjusting an intake throttle in the boosted region, air flow rate errors resulting from the boost pressure control can be corrected and compensated for, improving both an accuracy and speed of torque delivery in the boosted operating region. Overall, boosted engine performance is improved, providing fuel economy benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a boosted engine system, comprising:
   in response to no indication of recirculation valve degradation, providing a demanded boost pressure by concurrently adjusting each of a wastegate and a compressor recirculation valve based on an error, estimated at a controller, between actual boost pressure and desired boost pressure, while concurrently adjusting an intake throttle based on an error, estimated at the controller, between actual manifold airflow rate and a desired manifold airflow rate; and
   in response to an indication of recirculation valve degradation, providing the demanded boost pressure by only adjusting a position of the wastegate and the intake throttle to reduce the error between actual boost pressure and desired boost pressure.

2. The method of claim 1, wherein the compressor recirculation valve is a continuously variable recirculation valve.

3. The method of claim 2, wherein the concurrently adjusting further includes,
   adjusting the compressor recirculation valve based on a surge limit to move a compressor operating point of the boosted engine system away from a hard surge limit.

4. The method of claim 3, wherein adjusting the wastegate based on the error between actual boost pressure and desired boost pressure includes feed-forward adjusting the wastegate to a first position based on the desired boost pressure, the wastegate moved to a more closed first position as the desired boost pressure increases, the method further comprising feedback adjusting the wastegate with a higher than default gain tuning from the first position to a second position based on the error between actual boost pressure and desired boost pressure.

5. The method of claim 4, wherein adjusting the compressor recirculation valve based on the surge limit includes increasing an opening of the compressor recirculation valve in response to the operating point of the compressor being at the hard surge limit; and wherein adjusting the compressor recirculation valve based on the error between actual boost pressure and desired boost pressure includes further adjusting the opening of the compressor recirculation valve based on the error between actual boost pressure and desired boost pressure.

6. The method of claim 5, wherein adjusting the intake throttle includes,
   estimating a desired manifold flow rate based on a driver torque demand;
   estimating a manifold flow rate error between an actual manifold flow rate and the desired manifold flow rate;
   when the manifold flow rate error is a positive error, decreasing an opening of the intake throttle; and
   when the manifold flow rate error is a negative error, increasing the opening of the intake throttle.

7. The method of claim 4, further comprising, in response to an indication of compressor recirculation valve degradation, shifting the feedback adjusting of the wastegate from the higher than default gain tuning to a lower default gain tuning.

8. A method for operating an engine, comprising:
   in response to a boost demand,
      adjusting a wastegate coupled across an exhaust turbine to meet the boost demand; and
   adjusting a continuously variable recirculation valve coupled across an intake compressor based on the wastegate adjustment and further based on an error, estimated at a controller, between actual boost and the boost demand, wherein adjusting the wastegate includes feed-forward adjusting the wastegate to a first position based on the boost demand; the method further comprising feedback adjusting the wastegate from the first position based on the error between the actual boost and the boost demand, wherein adjusting the continuously variable recirculation valve includes:
      feed-forward adjusting the continuously variable recirculation valve to a first position based on a compressor outlet flow rate resulting from the wastegate adjustment to move a compressor operating point away from each of a hard surge limit and a soft surge limit of the compressor; and
      feedback adjusting the continuously variable recirculation valve from the first position based on the error between the actual boost and the boost demand.

9. The method of claim 8, further comprising adjusting an intake throttle coupled downstream of the compressor based on the boost demand and an intake manifold airflow rate.

10. The method of claim 9, further comprising, after adjusting the intake throttle, further adjusting the continuously variable recirculation valve to reduce the error between the actual boost and the boost demand resulting from the intake throttle adjustment.

11. The method of claim 8, wherein the feedback adjusting of the wastegate and the feedback adjusting of the continuously variable recirculation valve are performed with a higher than default gain tuning.

12. The method of claim 11, further comprising receiving an indication of continuously variable recirculation valve degradation, and in response to the indication, lowering gain tuning of the feedback adjusting of the wastegate from the higher than default gain tuning.

13. The method of claim 8, further comprising adjusting an intake throttle coupled upstream of the compressor based on a difference between desired airflow rate and actual airflow rate, the desired airflow rate based on operator torque demand.

14. An engine system, comprising:

an engine including an intake and an exhaust;

a turbocharger for providing a boosted aircharge to the engine, the turbocharger including an exhaust turbine and an intake compressor;

a wastegate coupled across the turbine;

a continuously variable recirculation valve coupled across the compressor;

a throttle coupled to the intake, downstream of the compressor; and a controller with computer readable instructions for,
- in response to no indication of recirculation valve degradation, operating the engine system in a first mode wherein a position of the wastegate, the intake throttle, and a position of the recirculation valve are adjusted to reduce an error between actual boost pressure and desired boost pressure based on operator torque demand; and
- in response to an indication of recirculation valve degradation, operating the engine system in a second mode wherein only the position of the wastegate and the intake throttle are adjusted to reduce the error between actual boost pressure and desired boost pressure.

15. The system of claim 14, wherein, when operating the engine system in the first mode, the position of the wastegate is adjusted with a higher than default gain tuning, and, when operating the engine system in the second mode, the position of the wastegate is adjusted with a lower, default gain tuning.

16. The system of claim 14, wherein operating in the second mode includes,
- feed-forward adjusting the wastegate to a first position based on the desired boost pressure;
- then feedback adjusting the wastegate from the first position based on the error between actual boost pressure and desired boost pressure; and
- adjusting the throttle to a position based on a flow rate error between an actual flow rate based on the wastegate adjustment and a desired flow rate based on the desired boost pressure.

17. The system of claim 14, wherein operating in the first mode includes,
- feed-forward adjusting the wastegate to a first wastegate position based on the desired boost pressure;
- then feedback adjusting the wastegate from the first wastegate position based on the error between actual boost pressure and desired boost pressure;
- feed-forward adjusting the recirculation valve to a second recirculation valve position based on a compressor surge limit;
- then feedback adjusting the recirculation valve from the second recirculation valve position based on the error between actual boost pressure and desired boost pressure; and
- adjusting the throttle to a third throttle position based on a flow rate error between an actual flow rate based on each of the wastegate adjustment and the recirculation valve adjustment, and a desired flow rate based on the desired boost pressure.

* * * * *